April 9, 1929.  N. COATE ET AL  1,708,081
NONSKID ATTACHMENT FOR AUTOMOBILES
Original Filed Feb. 24, 1927   2 Sheets-Sheet 1
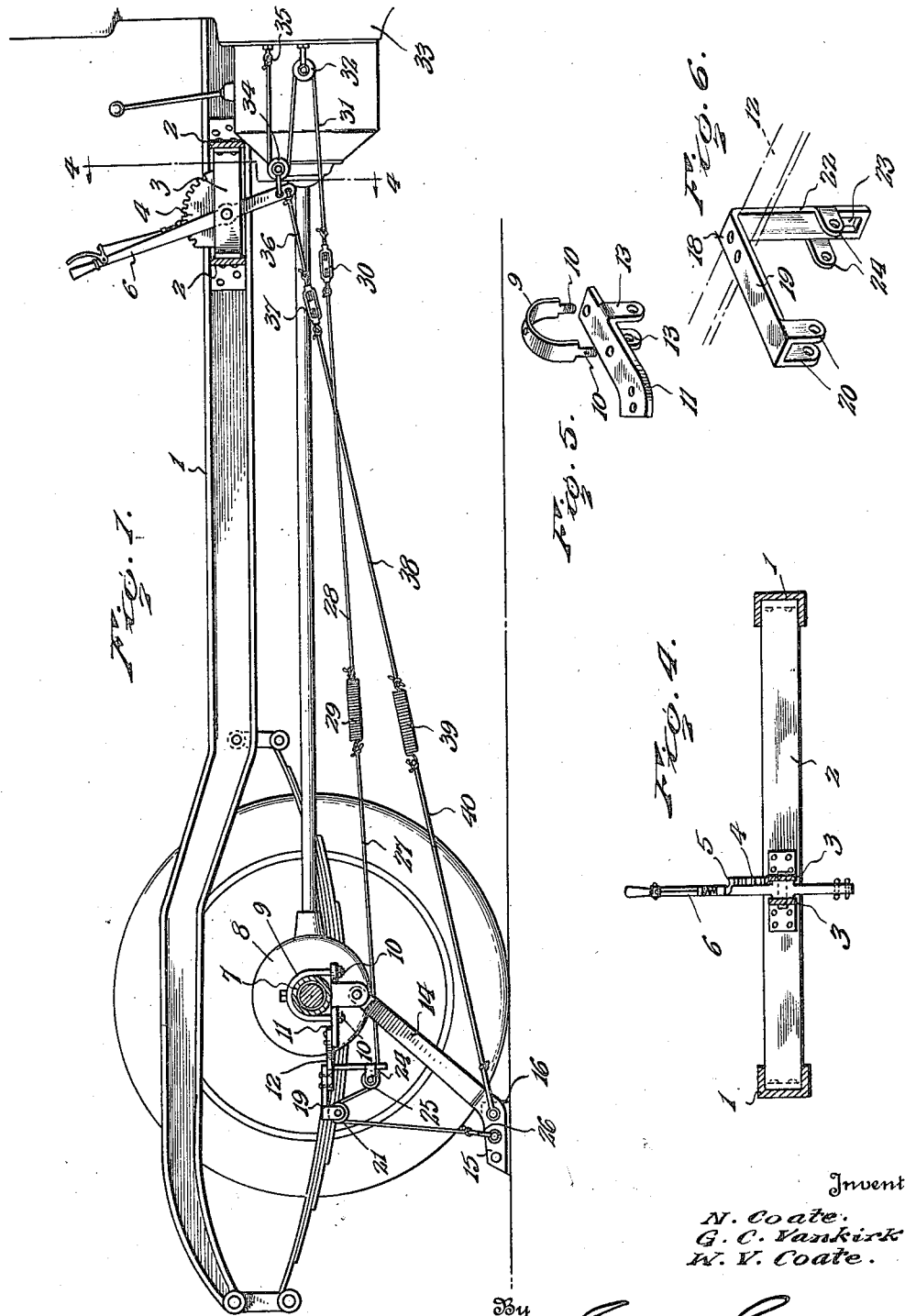

April 9, 1929.  N. COATE ET AL  1,708,081
NONSKID ATTACHMENT FOR AUTOMOBILES
Original Filed Feb. 24, 1927   2 Sheets-Sheet 2
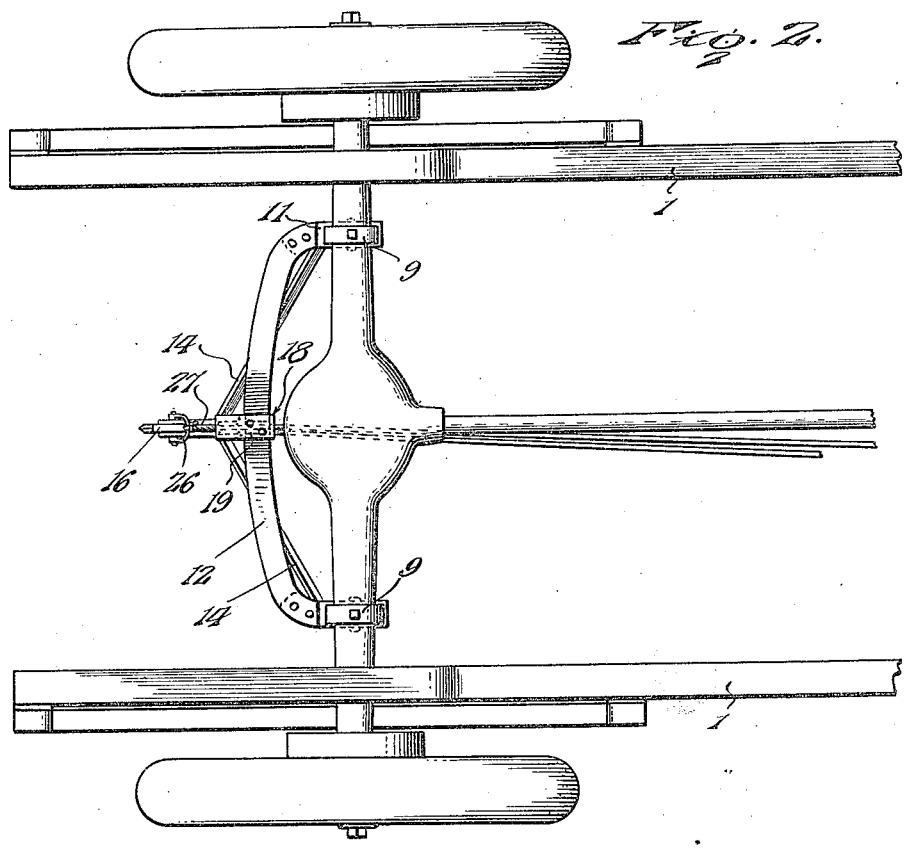
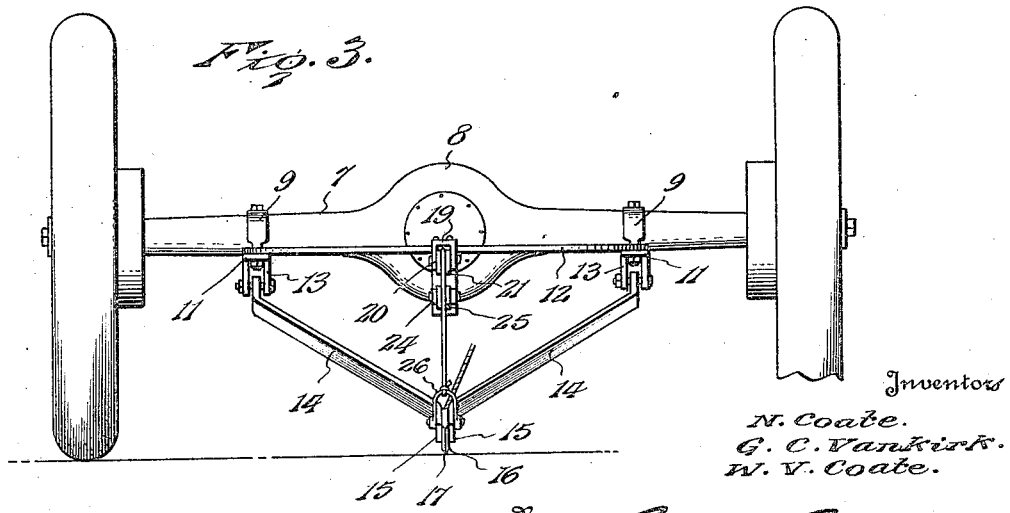

Patented Apr. 9, 1929.

1,708,081

UNITED STATES PATENT OFFICE.

NOAH COATE, GEORGE C. VANKIRK, AND WILLIAM VERNAL COATE, OF GREENVILLE, OHIO.

NONSKID ATTACHMENT FOR AUTOMOBILES.

Application filed February 24, 1927, Serial No. 170,644. Renewed August 13, 1928.

The present invention is directed to improvements in non-skid attachments for automobiles.

The primary object of the invention is to provide a device of this character which can be easily applied to an automobile, and when in place thereon will prevent skidding thereof.

Another object of the invention is to provide a device of this kind which is simple in construction, durable, efficient in operation, and one which can be quickly operated by the driver when necessary.

Another object of the invention is to provide a device of this type which not only serves to prevent skidding of the automobile, but can be used to prevent retrograde movement thereof should the brakes of the automobile fail to operate.

In the accompanying drawings:

Figure 1 is a longitudinal sectional view through an automobile frame, showing the device in place thereon and in its operative position.

Figure 2 is a fragmentary plan view.

Figure 3 is a rear elevation.

Figure 4 is a sectional view on line 4—4 of Figure 1.

Figure 5 is a detail perspective view of one of the clips and tie bar plates.

Figure 6 is a perspective view of the bracket.

Referring to the drawings, 1 designates the side sills of the frame, having bolted thereto cross bars 2 and to which are bolted the ends of the laterally spaced bars 3. One of the bars 3 has associated therewith a toothed segment 4 for cooperation with the pawl 5 carried by the lever 6, said lever being pivotally connected intermediate its ends between said bars, as clearly shown in Figure 4 of the drawings, the purpose of which will later appear.

Embracing the rear axle housing 7 and upon opposite sides of the differential housing 8 are U-shaped clips 9 which have their threaded shanks 10 bolted to the plates 11 carried by the ends of the arcuate tie bar 12. The plates 11 have spaced depending ears 13 between which are pivotally connected the forward ends of the curved arms 14, the outer ends of which are provided with off-sets 15 between which the shoe 16 is secured, said shoe having a cutting edge 17 designed to cut into the surface when in its operative position, as shown in Figure 1 of the drawings.

An angular bracket 18 is provided and has its horizontal arm 19 bolted to the tie bar 12, the forward end of said arm having depending ears 20 between which is pivotally mounted a grooved pulley 21. The vertical arm 22 of the bracket is provided with a slot 23 and adjacent said slot are spaced ears 24 for rotatably supporting the grooved pulley 25 therebetween.

Engaged in the offsets 15 and shoe 16 is a clip 26 to which is connected the rear end of a cable or chain section 27 which is connected to the section 28 by a coil spring 29, the latter section having its forward end secured to a turnbuckle 30, which in turn, is connected to a cable section 31. The cable section 31 is trained around a pulley 32 carried by the engine 33 and the pulley 34 carried by the lower end of the lever 6, the forward terminal of the cable section 31 being fixed to the engine, as at 35. The cable section 27 is trained around the pulleys 21 and 25 carried by the arms of the bracket 18, and since the slot 23 is below the housing 8 said section will be permitted to slide without interference.

Connected to the lower end of the lever 6 is a short section of cable 36 having secured thereto a turnbuckle 37, which in turn, is connected to the forward end of the cable section 38, said section having its rear end connected to a coil spring 39. Connecting the shoe 15 and spring 39 is a cable section 40. By employing the turnbuckles 30 and 37 the respective cable sections can be maintained in a taut condition to prevent sagging thereof. As shown in Figure 1 of the drawings the shoe 15 is in its operative position, that is, having its cutting edge 17 engaged with the surface, and at which time the lever 6 is in its rearward position. When the lever is swung forwardly the cable sections 38 and 40 will move rearwardly, whereupon the cable sections 27 and 28 will move forwardly due to engagement of the pulley 34 with the cable section 31, thereby elevating the shoe sufficiently to clear all road obstructions. The spring 39 will yieldably hold the shoe 15 engaged with the surface and will permit the same to pass over road obstructions.

It will be apparent that should the automobile start to back down grade that the lever 6 can be swung rearwardly to such a degree that the rear end of the shoe will bite into the surface and arrest the movement of the automobile.

The shoe 15 may be dropped in an emergency or, if desired, it can be lowered and maintained in its operative position when a slippery stretch of road is encountered.

It will be obvious that the tie bar 12, not only serves to maintain the clips 9 in proper spaced relation, but also serves to support the bracket 18 in order that the cable section 27 will be properly guided by the pulleys 21 and 25.

Having thus described the invention, we claim:

The combination with an automobile, a tie bar fixed to the rear axle thereof, arms pivotally connected with the tie bar and having a surface engaging shoe carried thereby, a bracket carried by the tie bar and having spaced pulleys mounted thereon, a lever carried by the automobile, pulleys carried by the lever and engine of the automobile, flexibly connected cable sections trained, respectively, around the pulleys and having their respective outer terminals connected to the engine and shoe, and flexibly connected cable sections connecting the lever and shoe.

In testimony whereof we affix our signatures.

NOAH COATE. [L. S.]
GEORGE C. VANKIRK. [L. S.]
WILLIAM VERNAL COATE. [L. S.]